(12) United States Patent
Kobetz

(10) Patent No.: US 12,291,218 B2
(45) Date of Patent: May 6, 2025

(54) METHOD FOR CALIBRATING A LIDAR SENSOR

(71) Applicant: MERCEDES-BENZ GROUP AG, Stuttgart (DE)

(72) Inventor: Christian Kobetz, Horb (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 216 days.

(21) Appl. No.: 17/916,229

(22) PCT Filed: Feb. 19, 2021

(86) PCT No.: PCT/EP2021/054202
§ 371 (c)(1),
(2) Date: Sep. 30, 2022

(87) PCT Pub. No.: WO2021/197709
PCT Pub. Date: Oct. 7, 2021

(65) Prior Publication Data
US 2023/0150519 A1   May 18, 2023

(30) Foreign Application Priority Data

Apr. 3, 2020 (DE) .................. 10 2020 109 374.8
Dec. 14, 2020 (DE) .................. 10 2020 007 645.9

(51) Int. Cl.
*B60W 50/02* (2012.01)
*B60W 50/06* (2006.01)
(Continued)

(52) U.S. Cl.
CPC ........ *B60W 50/0205* (2013.01); *B60W 50/06* (2013.01); *B60W 60/0018* (2020.02);
(Continued)

(58) Field of Classification Search
CPC ..... B60W 2420/403; B60W 2420/408; B60W 30/0956; B60W 2554/4041; B60W 30/12;
(Continued)

(56) References Cited

U.S. PATENT DOCUMENTS 8,825,260 B1 * 9/2014 Silver ................... G01S 13/931
342/159
8,928,757 B2 * 1/2015 Maekawa ............ H04N 17/002
348/148

(Continued)

FOREIGN PATENT DOCUMENTS

DE   102005037094 B3   10/2006
DE   102014014295 A1   3/2016
(Continued)

OTHER PUBLICATIONS

DE_102020102466 image and translation (Year: 2020).*
(Continued)

*Primary Examiner* — Joan T Goodbody
(74) *Attorney, Agent, or Firm* — PATENT PORTFOLIO BUILDERS PLLC

(57) ABSTRACT

Decalibration of a Lidar sensor of a vehicle is identified using a reference and verification measurement, each of which projects at least one line on a road surface. A position of the projected at least one lines from the reference and verification measurements are compared to determine whether the lines are displaced from each other by more than a specified amount, in which case degradation of the Lidar sensor is identified.

9 Claims, 2 Drawing Sheets

Figure 1:
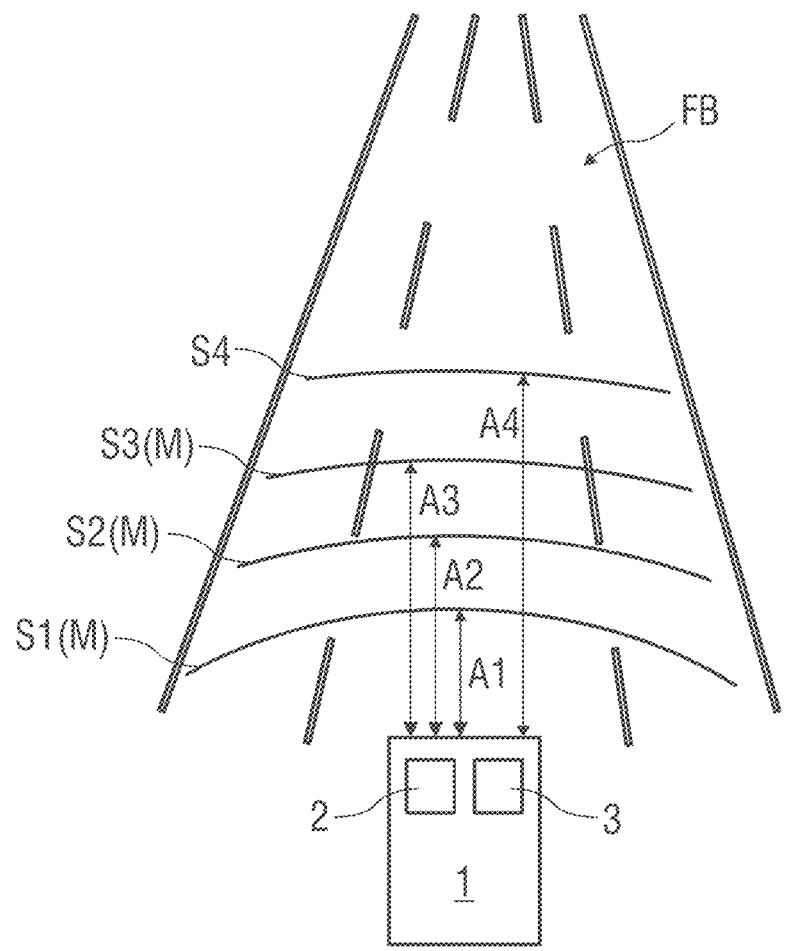

(51) Int. Cl.
    *B60W 60/00*           (2020.01)
    *G01S 7/497*           (2006.01)
    *G01S 17/931*         (2020.01)

(52) U.S. Cl.
    CPC ............ *G01S 7/497* (2013.01); *G01S 17/931*
                (2020.01); *B60W 2050/0215* (2013.01)

(58) Field of Classification Search
    CPC ........ B60W 2050/0088; G05D 1/0246; G05D
                1/0231; G05D 1/0055; G05D 1/0255;
            G05D 1/0257; G01S 19/42; G01S 17/86;
                     G01S 2013/93271; G01S 7/497
    See application file for complete search history.

(56) References Cited

U.S. PATENT DOCUMENTS

| | | | | |
|---|---|---|---|---|
| 9,052,721 | B1* | 6/2015 | Dowdall | G05D 1/024 |
| 9,866,819 | B2* | 1/2018 | Suzuki | G01C 3/08 |
| 9,927,813 | B1* | 3/2018 | Ferguson | G01S 13/931 |
| 10,107,899 | B1* | 10/2018 | Han | G01S 17/42 |
| 10,392,013 | B2* | 8/2019 | Hakki | G01S 13/931 |
| 10,688,987 | B2* | 6/2020 | Bariant | B60W 30/06 |
| 10,788,316 | B1* | 9/2020 | Kalscheur | G01S 7/4972 |
| 11,243,308 | B2 | 2/2022 | Matsui | |
| 11,321,210 | B2* | 5/2022 | Huang | G06F 11/3006 |
| 11,460,855 | B1* | 10/2022 | Lim | G05D 1/024 |
| 11,506,769 | B2 | 11/2022 | Zhou et al. | |
| 11,629,835 | B2* | 4/2023 | Kuffner, Jr. | G06T 7/90 |
| | | | | 362/466 |
| 11,747,453 | B1* | 9/2023 | Shepard | G01S 7/4802 |
| | | | | 356/5.01 |
| 11,906,672 | B2* | 2/2024 | Fendt | G01S 7/4808 |
| 2006/0114320 | A1* | 6/2006 | Nagaoka | G06T 7/73 |
| | | | | 348/118 |
| 2006/0290920 | A1* | 12/2006 | Kampchen | G01S 7/4972 |
| | | | | 356/139.07 |
| 2010/0179781 | A1* | 7/2010 | Raphael | H04N 17/002 |
| | | | | 702/94 |
| 2010/0194886 | A1* | 8/2010 | Asari | G06T 7/85 |
| | | | | 348/148 |
| 2010/0235129 | A1* | 9/2010 | Sharma | G01S 17/86 |
| | | | | 702/97 |
| 2010/0253493 | A1* | 10/2010 | Szczerba | G02B 27/01 |
| | | | | 345/593 |
| 2011/0018973 | A1* | 1/2011 | Takayama | H04N 23/671 |
| | | | | 348/47 |
| 2012/0081542 | A1* | 4/2012 | Suk | H04N 7/181 |
| | | | | 382/103 |
| 2013/0321629 | A1* | 12/2013 | Zhang | G06T 3/00 |
| | | | | 348/148 |
| 2014/0320658 | A1* | 10/2014 | Pliefke | H04N 17/002 |
| | | | | 348/148 |
| 2015/0102995 | A1* | 4/2015 | Shen | G09G 5/00 |
| | | | | 345/156 |
| 2015/0260833 | A1* | 9/2015 | Schumann | G01S 15/88 |
| | | | | 367/13 |
| 2015/0362587 | A1* | 12/2015 | Rogan | G01S 7/4972 |
| | | | | 702/104 |
| 2015/0367855 | A1* | 12/2015 | Parchami | G06V 20/588 |
| | | | | 701/1 |
| 2016/0349371 | A1* | 12/2016 | Suzuki | G01S 17/10 |
| 2017/0018087 | A1* | 1/2017 | Yamaguchi | G01B 11/002 |
| 2017/0160094 | A1* | 6/2017 | Zhang | H04N 9/3155 |
| 2017/0169627 | A1* | 6/2017 | Kim | G01S 13/862 |
| 2017/0210282 | A1* | 7/2017 | Rodriguez Barros | B60Q 1/324 |
| 2017/0309066 | A1* | 10/2017 | Bybee | G06T 15/04 |
| 2017/0345159 | A1* | 11/2017 | Aoyagi | G06T 7/207 |
| 2018/0143018 | A1* | 5/2018 | Kimura | G01B 11/2545 |
| 2018/0342113 | A1* | 11/2018 | Kislovskiy | G07C 5/008 |
| 2019/0049958 | A1* | 2/2019 | Liu | G01S 17/00 |
| 2019/0118705 | A1* | 4/2019 | Yu | G05D 1/0088 |
| 2019/0152487 | A1* | 5/2019 | Tokuhiro | G06T 7/00 |
| 2019/0285726 | A1* | 9/2019 | Muto | G01S 7/40 |
| 2019/0324129 | A1* | 10/2019 | Castorena Martinez | |
| | | | | G01C 11/06 |
| 2020/0041650 | A1 | 2/2020 | Matsui | |
| 2020/0064483 | A1* | 2/2020 | Li | G01S 13/867 |
| 2020/0082570 | A1* | 3/2020 | Wunderwald | B60K 35/50 |
| 2020/0191927 | A1* | 6/2020 | Lin | G01S 7/497 |
| 2020/0209853 | A1* | 7/2020 | Leach | G01S 7/4972 |
| 2020/0249354 | A1* | 8/2020 | Yeruhami | G01S 7/4911 |
| 2020/0284882 | A1* | 9/2020 | Kirillov | G01S 7/4815 |
| 2020/0410704 | A1* | 12/2020 | Choe | G01S 7/497 |
| 2021/0025997 | A1* | 1/2021 | Rosenzweig | G01S 7/4817 |
| 2021/0033255 | A1* | 2/2021 | Kuffner, Jr. | G01S 7/4972 |
| 2021/0201464 | A1* | 7/2021 | Tariq | G06V 10/811 |
| 2021/0208263 | A1* | 7/2021 | Sutavani | G01S 17/42 |
| 2021/0221389 | A1* | 7/2021 | Long | B60W 30/182 |
| 2021/0264169 | A1* | 8/2021 | Speigle | G06T 3/4015 |
| 2021/0278543 | A1* | 9/2021 | Simon | F16M 11/10 |
| 2021/0389469 | A1* | 12/2021 | Sakata | B60W 40/08 |
| 2022/0118901 | A1* | 4/2022 | El Idrissi | B62D 15/0265 |
| 2022/0137196 | A1* | 5/2022 | Hayashi | G01S 17/86 |
| | | | | 356/6 |
| 2023/0082700 | A1* | 3/2023 | Schindler | G01S 7/497 |
| | | | | 348/118 |
| 2023/0184900 | A1* | 6/2023 | Newman | G01S 7/497 |
| | | | | 356/4.01 |

FOREIGN PATENT DOCUMENTS

| | | | | |
|---|---|---|---|---|
| DE | 102020102466 | * | 8/2021 | .......... G01S 17/931 |
| EP | 3001137 A1 | | 3/2016 | |
| JP | 2016045330 A | | 4/2016 | |
| JP | 2020020694 A | | 2/2020 | |
| JP | 2020042024 A | | 3/2020 | |
| WO | 2020054392 A1 | | 3/2020 | |

OTHER PUBLICATIONS

Office Action dated Jun. 27, 2023 in related/corresponding JP Application No. 2022-560266.
International Search Report mailed Apr. 28, 2021 in related/corresponding International Application No. PCT/EP2021/054202.
Written Opinion mailed Apr. 28, 2021 in related/corresponding International Application No. PCT/EP2021/054202.
Office Action dated Jan. 25, 2025 in related/corresponding KR Application No. 2022-7031954.
Office Action created Feb. 19, 2025 in related/corresponding DE Application No. 10 2020 007 645.9.

* cited by examiner

METHOD FOR CALIBRATING A LIDAR SENSOR

BACKGROUND AND SUMMARY OF THE INVENTION

Exemplary embodiments of the invention relate to a method for calibrating a Lidar sensor of a vehicle by means of a camera, as well as to a use of such a method.

A method for calibrating a sensor for distance measurement with two sensor channels is known from DE 10 2005 037 094 B3, the radiation of which is lobe-shaped.

The method comprises the following steps:
- transmitting a radiation lobe of a sensor channel onto a calibration surface by means of the sensor,
- detecting the radiation lobe with a camera of a video system,
- identifying a first representative value of the radiation lobe in image coordinates of the camera,
- adjusting a position of the calibration surface in relation to the sensor and the camera,
- detecting the radiation lobe with the camera,
- identifying a second representative value of the radiation lobe in image coordinates of the camera,
- repeating the preceding steps for a further sensor channel,
- modelling the lobe alignment of the emitted radiation lobes as straight lines in sensor coordinates,
- transforming the modelled straight lines from sensor coordinates into image coordinates of the camera,
- comparing the straight lines with the identified representative values in image coordinates for every sensor channel,
- identifying a calibration function to compensate for a possible deviation of the modelled straight lines from several representative values.

The sensor is a Lidar system based on light emission and light absorption or a Lidar sensor.

Exemplary embodiments of the invention are directed to a method for calibrating a Lidar sensor of a vehicle that is improved compared to the prior art, and a use of such a method.

In one method for calibrating a Lidar sensor of a vehicle, laser radiation is transmitted onto a road surface by means of the lidar sensor and it is detected as laser radiation reflected back to the Lidar sensor by means of the Lidar sensor.

According to the invention, a reference measurement is taken in a calibrated state by means of the Lidar sensor. Here, the laser radiation is emitted in at least one predetermined scanning plane and at least one line is hereby projected onto the road surface. By detecting the laser radiation reflected back, the position of this at least one line relative to the vehicle is identified and saved for a later evaluation. A reference measurement is taken at a later time. During the reference measurement, the laser radiation is likewise emitted in the at least one predetermined scanning plane, and at least one line is hereby also projected onto the road surface. By detecting the laser radiation reflected back, the position of this at least one line relative to the vehicle is identified. It is then checked whether the positions identified during the reference measuring and verification measuring are displaced relative to each other. If a displacement by more than a specified level is found, it is concluded there is a degradation of the Lidar sensor.

The identification of the positions of the lines projected onto the road advantageously relies on an identification of distances between the respective lines and the vehicle.

To use a Lidar sensor, a calibration of the same is necessary. A quick test of whether the Lidar sensor is still calibrated is very advantageous for a rapid availability of vehicle systems operated by data collected by means of the Lidar sensor, for example vehicle systems for the execution of an automated, in particular highly automated, or autonomous or driverless driving operation. Such an especially fast and simultaneously reliable test can be implemented with low effort by means of the method.

In one possible embodiment of the method, the displacement is only then identified if the reference measurement and the verification measurement are taken at the same place, i.e., at the same vehicle position. Due to the road curvature, the lines projected onto the road surface can be distorted. If the reference measurement and the verification measurement are taken at the same place, the lines projected onto the road surface are distorted in the same way. In this way, measurement errors caused by road curvature can be avoided.

In a further possible embodiment of the method, the reference measurement and verification measurement are taken while the vehicle is stationary. For example, the reference measurement is taken while the vehicle is parked, and the verification measurement is taken during the subsequent starting of the vehicle. In this way, it can be determined whether an event took place during parking or in the time between the reference measurement and the verification measurement being taken, that led to the de-calibration of the sensor. Such an event could, for example, be a change in the load of the vehicle or the weight distribution in the vehicle, or a change of tire. With the method, it can quickly be checked whether the Lidar sensor is calibrated, for example by briefly stopping in a car park or at a petrol station. If it is verified that the Lidar sensor is calibrated, learnt calibration parameters can be used for operation. Otherwise, an online calibration can be initiated in order to update the calibration parameters.

In a further possible embodiment of the method, more than one line is projected on the road surface during the reference measuring and the verification measuring respectively. The lines projected onto the road surface during the reference measuring form a reference pattern and the lines projected onto the road surface during the verification measuring form a verification pattern. Such patterns with line-shaped structures can be particularly easily generated, detected, and evaluated.

In a further possible embodiment of the method, the lines are generated by means of several lasers of the Lidar sensor that are arranged one on top of the other. Such a generation can be carried out particularly simply and precisely.

In a further possible embodiment of the method, the projection of the defined pattern onto the road surface during the verification measuring is carried out for a specified time period, for example for a duration of 30 seconds. Such a time period enables a reduction of the influence of road fluctuations by averaging or integration.

In the use according to the invention, the previously described method is used in an automated, in particular highly automated, or autonomously operable vehicle. Due to the particularly quick availability of data collected by means of the Lidar sensor for vehicle systems for carrying out the automated driving operation, such automated driving operation can be especially quickly and reliably started after a vehicle stop.

In this context, if, for example, a decalibration of the Lidar sensor is recognized, the automated, in particular highly automated, or autonomous operation of the vehicle is stopped and/or locked. In this way, traffic safety is significantly increased.

BRIEF DESCRIPTION OF THE DRAWING FIGURES

Exemplary embodiments of the invention are illustrated in more detail in the following, using drawings.

Figure 2:
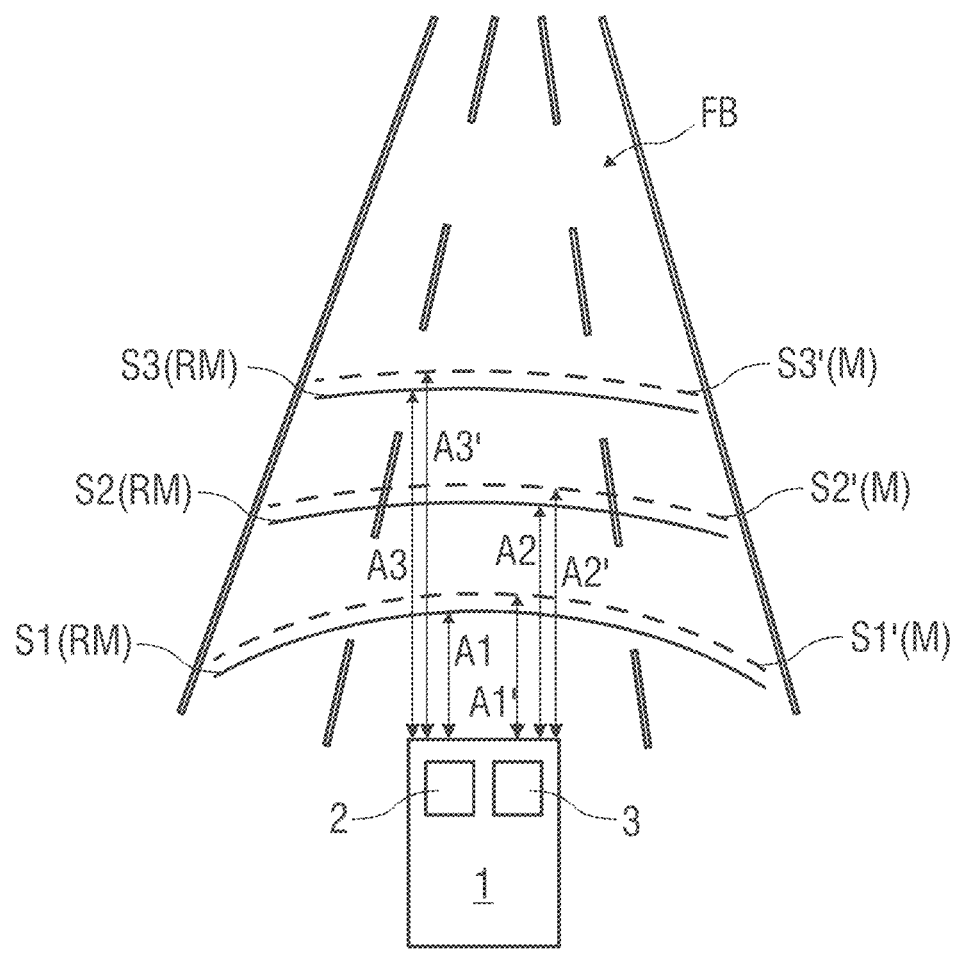

Here:

FIG. 1 schematically shows a perspective view of a vehicle and a road surface at a first point in time; and FIG. 2 schematically shows a perspective view of the vehicle and the road surface according to FIG. 1 at a second point in time.

DETAILED DESCRIPTION

Parts that correspond to each other are provided with the same reference numerals in all figures.

In FIG. 1, a perspective view of the vehicle 1 and a road surface FB at a first point in time, at which the reference measurement is taken, is shown.

The vehicle 1 comprises a Lidar sensor 2, which emits laser radiation in a conventional manner and detects the laser radiation that is reflected back. At least the data collected by means of the Lidar sensor 2 about a vehicle's surroundings is used to for an automated, in particular highly automated, or autonomous or driverless operation of the vehicle 1.

Due to changing load conditions of the vehicle 1, changes to the vehicle and outside influences, an orientation of the Lidar sensor 2 can be changed relative to the vehicle's environment, which influences the data collected by means of the Lidar sensor 2. For this reason, an exact calibration, in particular online calibration, of the Lidar sensor 2 is always necessary.

While the vehicle 1 is being parked, the Lidar sensor 2 can become decalibrated due to a parking maneuver. If the parking process is ended and the vehicle 1 is put back into operation, it is important to recognize quickly whether the Lidar sensor 2 is still calibrated, or is decalibrated. With a decalibrated Lidar sensor 2, operational safety during automated or driverless operation is no longer guaranteed. In one such case, the automated or driverless operation of the vehicle 1 is locked, at least until the Lidar sensor 2 has been recalibrated, for example by means of an online calibration.

In order to recognize a decalibrated state of the Lidar sensor 2, a reference measurement is first taken. In this process, one or more lines S1, S2, S3, S4 or a reference pattern RM made up of several lines are projected by means of laser radiation onto the in particular flat road surface FB. In this capacity, the Lidar sensor 2 is designed for so-called line scans, in which several lasers of the Lidar sensor 2, which are arranged one on top of the other, produce lines S1, S2, S3, S4 at different distances A1 to A4, so-called layers, on the road surface FB. In this process a distance A1 to A4 to the vehicle 1 increases with the growing height of the arrangement of the lasers. The first three lines S1, S2, S3 here form the reference pattern RM.

This reference pattern RM is recorded by the Lidar sensor 2 and is saved as the reference pattern RM as shown in FIG. 2. In further possible exemplary embodiments, the reference pattern RM can be formed by means of a different number of lines S1, S2, S3.

FIG. 2 shows a perspective view of the vehicle 1 and the road surface FB according to FIG. 1 at a later, second point in time, in particular after a restart of the vehicle 1 or in a new ignition sequence. At this second point in time, a verification measurement is taken. In this context, the dashed lines S1', S2', S3' or the verification pattern M made up of these lines are projected onto the road surface FB and the positions of these lines S1', S2', S3' or the position of the verification pattern M relative to the vehicle 1 are identified.

A decalibration of the Lidar sensor 2 then occurs before this restart, for example, if the loading of the vehicle 1 has been significantly changed or if the orientation of the Lidar sensor 2 had been changed due to a mechanical action, for example in a collision with an obstacle. A displacement of the lines S1', S2', S3' projected onto the road surface FB at the second point in time compared to the lines S1', S2', S3' projected onto the road surface FB at the first point in time results from these changes, as does a displacement between the reference pattern RM and the verification pattern M.

Based on this displacement, which can for example be identified by the distances A1' to A3' between the lines S1' to S3' and the vehicle 1 being identified and then being compared with the distances A1 to A3 that are contained in the reference pattern RM, a decalibration of the Lidar sensor 2 can be identified.

This means that, to recognize a decalibration of the Lidar sensor 2, the verification M is projected onto the road surface FB by means of the Lidar sensor 2 and recorded by means of the Lidar sensor 2 during a verification measurement, for example during the starting of the vehicle. A displacement between the verification pattern M and the reference pattern RM is then identified and then, if the displacement exceeds a predetermined amount of, for example, +/−0.1 m, it is concluded there is a decalibration of the Lidar sensor 2.

When such a decalibration of the Lidar sensor 2 is recognized, the automated, in particular highly automated, or driverless operation of the vehicle 1 is, in one possible embodiment, stopped or blocked. Preferably, an online calibration is then started, and after its completion the automated, in particular highly automated, or driverless operation of the vehicle 1 is permitted again.

If the identified displacement does not exceed the specified amount, it is assumed that the Lidar sensor 2 is not decalibrated and data collected by means of the Lidar sensor 2 is used for calibration according to calibration parameters recorded in FIG. 1, for the operation of the Lidar sensor 2 and for evaluation.

The predetermined amount is in particular separately determined and set for different types of vehicle.

In order to be able to take account of any possible unevenness in the road surface during the verification measuring, the defined pattern M is projected onto the road surface FB and this is transmitted for a predetermined duration of, for example, 30 seconds during the verification measuring. In this way, measurement errors can be reduced by integration or averaging.

Furthermore, in one possible embodiment, the verification pattern M is compared with the reference pattern RM, to find whether the verification pattern M is distorted compared to the reference pattern RM. As such a distortion of the verification pattern M is an indication of a road curvature, and measurement errors can result from a road curvature, the distortion is in particular only then determined if it has previously been determined that the pattern generated in the verification measuring is undistorted compared to the reference pattern, or the distortion is below a specified tolerance value.

The laser radiation reflected back to the Lidar sensor 2 is detected in the present exemplary embodiment by means of a photodetector provided in the Lidar sensor 2. However, it is also conceivable to detect the radiation reflected back by means of a photodetector 3 arranged outside the Lidar sensor, for example by means of a camera that has a sensor chip sensitive to the wavelength of the laser radiation, typically IR radiation.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, the method comprising:
performing a reference measurement by
projecting, by a Lidar sensor of a vehicle, a first plurality of lines onto a road surface by emitting laser radiation in at least one of a predetermined scanning planes of the Lidar sensor,
detecting, by a photodetector, laser radiation reflected back from the road surface from the projection of the first plurality of lines, and
determining, using the laser radiation reflected back from the road, a distance between the vehicle and each of the first plurality of lines;
performing, at point in time subsequent to the reference measurement a verification measurement by
projecting, by the Lidar sensor, a second plurality of lines onto the road surface by emitting laser radiation in the at least one predetermined scanning plane of the Lidar sensor,
detecting, by the photodetector, laser radiation reflected back from the road surface from the projection of the second plurality of lines, and
determining, using the laser radiation reflected back from the road, a distance between the vehicle and each of the second plurality of lines;
comparing the distances determined using the first plurality of lines with the distances determined using the second plurality of lines;
identifying a degradation of the Lidar sensor if the comparison indicates a deviation greater than a predetermined deviation between the distances determined using the first plurality of lines with the distances determined using the second plurality of lines; and
recalibrating the Lidar sensor responsive to the identification of the degradation of the Lidar sensor, wherein the reference measurement and verification measurement are performed while the vehicle is stationary, wherein the reference measurement is performed when the vehicle is parked and the verification measurement is performed when the vehicle is then restarted.

2. The method of claim 1, wherein the first plurality of lines is a reference pattern, the second plurality of lines is a verification pattern, and wherein the comparison involves comparing the reference and verification patterns.

3. The method of claim 2, wherein the first plurality of lines and the second plurality of lines are generated by several lasers of the Lidar sensor, wherein the several lasers are arranged one on top of the other.

4. The method of claim 1, wherein the vehicle includes an automated driving operation, the method further comprising:
stopping or blocking the automated driving operation responsive to the identification of the degradation of the Lidar sensor.

5. The method of claim 4, further comprising:
permitting the automated driving operation responsive to the recalibration of the Lidar sensor.

6. The method of claim 1, wherein the reference and verification measurements are each performed for a predetermined duration, the distance between the vehicle and each of the first plurality of lines is determined by integration or averaging over the predetermined duration, and the distance between the vehicle and each of the second plurality of lines is determined by integration or averaging over the predetermined duration.

7. A method, the method comprising:
performing a reference measurement by
projecting, by a Lidar sensor of a vehicle, a first plurality of lines onto a road surface by emitting laser radiation in at least one of a predetermined scanning planes of the Lidar sensor,
detecting, by a photodetector, laser radiation reflected back from the road surface from the projection of the first plurality of lines, and
determining, using the laser radiation reflected back from the road, a distance between the vehicle and each of the first plurality of lines;
performing, at point in time subsequent to the reference measurement a verification measurement by
projecting, by the Lidar sensor, a second plurality of lines onto the road surface by emitting laser radiation in the at least one predetermined scanning plane of the Lidar sensor,
detecting, by the photodetector, laser radiation reflected back from the road surface from the projection of the second plurality of lines, and
determining, using the laser radiation reflected back from the road, a distance between the vehicle and each of the second plurality of lines;
comparing the distances determined using the first plurality of lines with the distances determined using the second plurality of lines;
identifying a degradation of the Lidar sensor if the comparison indicates a deviation greater than a predetermined deviation between the distances determined using the first plurality of lines with the distances determined using the second plurality of lines; and
recalibrating the Lidar sensor responsive to the identification of the degradation of the Lidar sensor,
wherein a distance between each of the first plurality of lines projected from the Lidar sensor is same as a distance between each of the second plurality of lines projected from the Lidar sensor so that, when the road surface is at a same vehicle position, deviations of distances between the first plurality of lines projected on the road surface and distances between the second plurality of lines projected on the road surface are indicative of the degradation of the Lidar sensor.

8. The method of claim 1, wherein the photodetector is part of the Lidar sensor.

9. The method of claim 1, wherein the photodetector is arranged outside of the Lidar sensor.

\* \* \* \* \*